Patented June 26, 1945

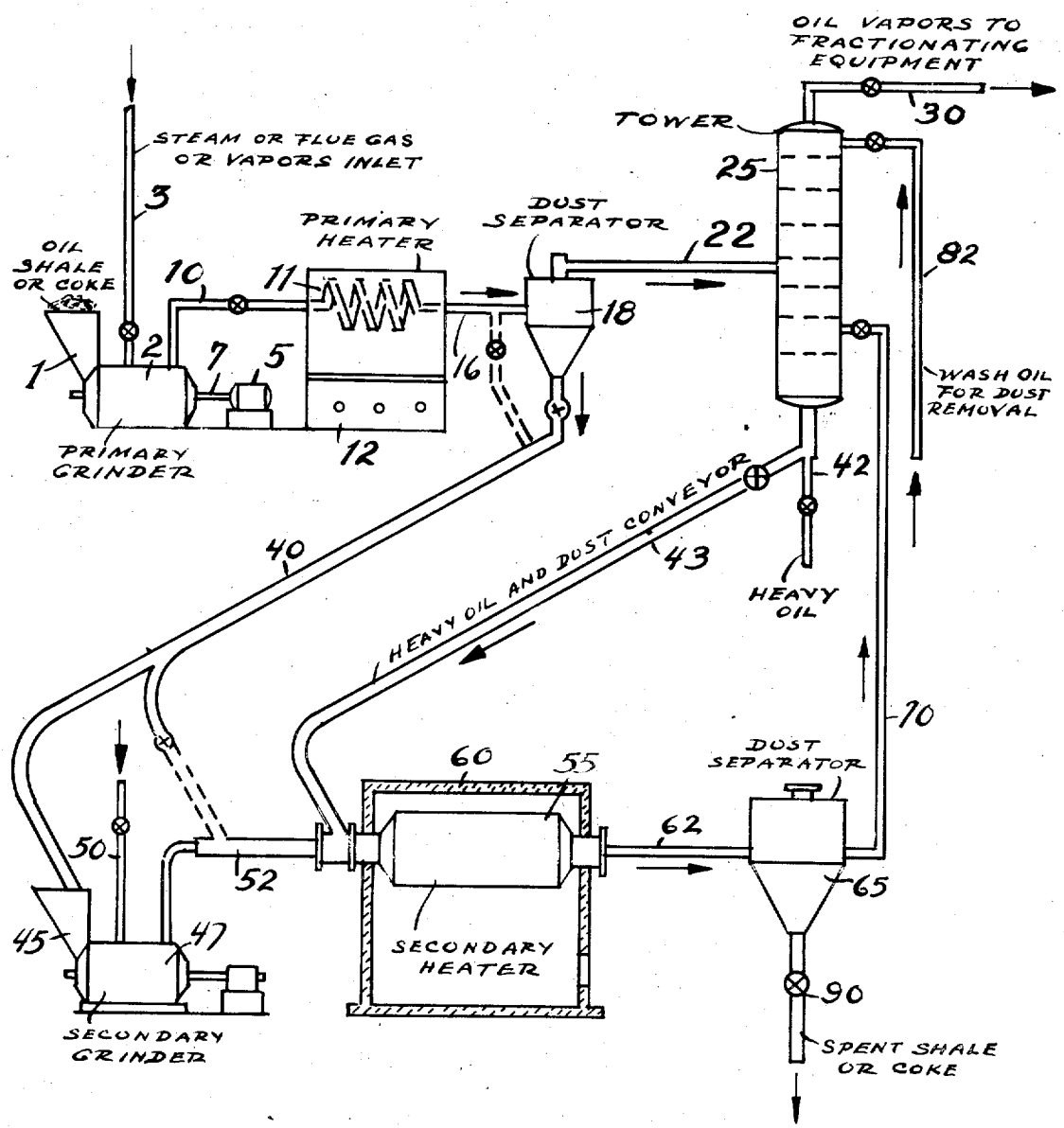

2,379,077

UNITED STATES PATENT OFFICE 2,379,077

PREPARATION OF HYDROCARBON OILS

Clarke T. Harding, Hillside, N. J., assignor to Standard Oil Development Company, a corporation of Delaware Application August 14, 1942, Serial No. 454,811

9 Claims. (Cl. 202—22)

The present invention relates to improvements in the art of treating bituminous material such as shale, oil sands, coal, and the like to recover therefrom valuable hydrocarbons, including gasoline, heating oils, etc.

In my present process, I have devised means for processing raw shale or the like continuously and under conditions adapted to produce maximum quantities of valuable hydrocarbon oils with a minimum of equipment and utilities.

The main object of the present invention is directed toward a commercially feasible process for producing hydrocarbon oils, including automotive and aviation fuel.

A more specific object of the present invention is to provide means for producing hydrocarbon oil, including gasoline and aviation fuel, from sources other than crude petroleum oil.

A further object of the present invention is to provide means adapted to produce hydrocarbon oils from non-petroleum sources continuously and economically.

Other and further objects will appear from the following more detailed description and claims.

In the accompanying drawing, I have indicated diagrammatically a flow plan illustrating a preferred modification of my invention.

I shall now set forth a specific example illustrating my invention and in so doing I shall refer to the drawing.

In the drawing 1 represents a supply hopper in which raw shale is contained, and this shale is discharged into a grinder 2 where it is ground to a particle size of say from 60-200 mesh or finer. The grinder is motivated by a suitable motor or other driving means 5, a projection of whose shaft 7 extends into the grinding means 2. Simultaneously steam, flue gas or hydrocarbon vapors either produced from the present process or supplied from extraneous source are also discharged into the grinding means 2 and these serve as a carrier gas to form a suspension of the ground shale in the said gas. In some cases it is desirable to heat these gases or vapors prior to introduction into the grinder. In the drawing, for simplicity sake, I have not shown any specific means for dispersing a powder in a gas or vapor, but it will be understood that any suitable means for effecting the formation of a suspension may be employed. The suspension is withdrawn through line 10 and discharged into a preheating coil 11 disposed in a suitable furnace 12 where the suspension is heated up to a temperature below 1000° F., preferably say from 700-900° F. The effect of so heating the ground shale is to liberate a portion of the hydrocarbons formed or contained within the shale, and the heated suspension is withdrawn through line 16 and discharged into a dust separator or a cyclone separator 18 where the vapors are separated from the shale and thence discharged through an overhead pipe 22 into a fractionator 25. From fractionator 25 an overhead fraction is recovered through line 30, and this fraction may be delivered to equipment (not shown) to recover hydrocarbons boiling within the gas oil range and gasoline range and lighter hydrocarbons.

Referring again to the cyclone separator 18, it is pointed out that two or more may be used in series to effect efficient separation of the dust or powdered shale from the gases, if that is necessary, and one or more Cottrell precipitators may be so employed. The separated shale is withdrawn from the bottom of cyclone separator 18 through pipe 40 and delivered into a second hopper 45 and thence discharged into a secondary grinder 47 where it is ground to a particle size of from 200-400 mesh or finer. The grinding means 47 may be similar in all details to grinding means 2, except that the shale is reduced to a finer state of subdivision. Also there is discharged into grinder 47 or other mixing device therein contained or associated therewith steam, flue gas, or hydrocarbon vapors through line 50 to form with the ground shale a suspension. A suitable grinding device that may be employed herein is, for example, the commonly known Raymond kiln mill. As is generally known, in this type of mill a material may be powdered and suspended in a gas. Of course, any other suitable equipment may be employed for this purpose. The suspension formed is withdrawn through line 52 and discharged into a second heating coil or drum 55 disposed within a suitable furnace 60 where the shale is heated up to a temperature of from 1000-1800° F. In this secondary heater, a further quantity of hydrocarbon oil is formed and/or distilled from the shale, and thereafter the suspension is withdrawn through line 62 and delivered to a second cyclone separator 65 where the shale is separated from the vapors. The vapors are withdrawn through line 70 and discharged into fractionator 25 where they are subjected to fractionation, together with vapors from line 22. The vapors from line 70 contain normally gaseous hydrocarbons, gasoline hydrocarbons, gas oil hydrocarbons, and a minor quantity of heavier hydrocarbons. The lighter hydrocarbons, of course, pass overhead through line 30, while the heavier fractions may be withdrawn through line 42 or they may be withdrawn through line 43 and discharged into a secondary heater 55 where they may be subjected to further treatment to produce increased quantities of gasoline. This recycling of the heavier fraction from fractionator 25 to secondary heater 55 is purely optional for it may be desirable to produce a minimum amount of gasoline by retorting the raw shale, since the gasoline thus produced will not ordinarily have a high octane number. Therefore, it is probably preferable to withdraw the bottoms from line 42 and subject them to a viscosity reducing operation to produce a gas oil fraction which may be catalytically cracked to form an automotive or aviation fuel base. If, however, the bottoms from fractionator 25 are to be recycled to heater 55, it is preferable to discharge a washing oil, such as a heavy gas oil, which may be obtained from the present system or from some extraneous source through line 82 into a point near the upper part of fractionator 25, the main purpose of the washing oil being to remove from the vapors entrained powdered shale. The use of the washing oil in line 82 may serve to reduce the number of cyclone separators that are necessary to remove the powdered shale from the hydrocarbon oil vapors or, in fact, the use of cyclone or other mechanical or electrical separators may be dispensed with altogether.

The shale separated from the vapors in separator 65 may be withdrawn through line 90, and since this shale contains a quantity of fixed or non-volatile carbon, it may be burnt in a combustion zone under proper conditions of temperature and oxygen supply and a portion of its sensible heat content may be recovered and used in the present process. For instance, the spent shale when burnt may attain a temperature of about 800° F. and obviously its sensible heat content will be considerable. This shale may be passed in heat exchange relationship with water or steam to form superheated steam, or it may be passed in heat exchange relationship with raw shale to preheat and dry the latter, or it may be actually mixed at temperatures to supply to the raw shale sufficient heat to dry and preheat the said raw shale. In most economical operations some use should be made of the spent shale to recover therefrom its available heat energy.

While I have shown by way of specific example, a method of processing raw shale, it is to be understood that I may subject powdered coal suspended in a suitable gas to destructive distillation to obtain valuable products therefrom, in a manner entirely analogous to that described above, or I may process oil-bearing sands or any other similar material adapted to yield hydrocarbons such as gasoline, gas oil, and the like.

This invention as described herein is especially advantageous in the processing of oil shales or in the coking of coals by virtue of its extreme flexibility in treating various types of shale or coal under the widely variant treating conditions which they individually require. Also, it is often desirable, and possible by this process, to vary the types of products which are obtained from any given shale source depending upon market conditions, by varying processing conditions.

For example, it is known that by maintaining relatively low temperatures and relatively long reaction times in the primary heater there may be produced therefrom a so-called primary product rich in unsaturates. Conversely, by employing higher temperatures and somewhat shorter times of reaction it is possible to concurrently carry out a considerable amount of cracking of the unsaturated primary materials, with the net result of producing more low boiling saturated material together with more unsaturated high boiling polymers and tars together with aromatics when the higher temperature levels are employed. Generally it is advantageous to produce the unsaturated type material, since they contain desirable olefinic and di-olefinic compounds, and subsequently to suitably treat this material elsewhere to segregate and purify the desired fractions. Furthermore, many shales contain nitrogenous compounds which may be converted into ammonia by employing proper operating conditions, namely, temperature of the order of 1500° F. and use of diluent steam. This reaction may be largely carried out in the secondary reaction zone in the case of those shales which do not give up nitrogen readily; on the other hand, with certain easily decomposable shales it is necessary to approach this temperature level and to add steam in the first reaction zone.

In general, it is desirable to operate the primary reactor at relatively low temperature when a secondary reactor is also used; i. e., about 750–1000° F. in the primary and 1000–1800° F. in the secondary. If no secondary reactor is employed, it then becomes necessary to employ somewhat higher temperatures in the single reactor; e. g., about 1000–1500° F., and in certain instances it may also be desirable to lengthen the time of reaction of the shale in the reactor, as by reducing thruput.

For the production of highly unsaturated products, the pressure is maintained at below 50 lbs. per square inch gauge, and the use of diluent steam, recycled gas, etc., is advisable to reduce the partial pressure of normally liquid hydrocarbons to the minimum practical value. Oil partial pressures of below 10 lbs. per square inch absolute are desirable for this type of operation. For the cracking type reaction, however, pressures of from 50–200 lbs. per square inch are desirable. Diluents may be used to heat the shale, that is to say, the steam or vapor, etc., used as diluent may be preheated to 500–1800° F. in an extraneous tubular furnace, regenerator, etc., prior to mixing with the shale, whereupon the shale is heated by the steam to about reaction temperature, thus reducing the direct heat input required to the reactor.

The time of contact required in the reactors is a function of several other processing variables employed, particularly the temperature level permissible as determined by the quality and yield of products it is desired to make and the fineness of grinding of the shale fed. It is a very definite advantage of this process that time requirements are minimized because of the basic principle employed; namely, the flotation of the charge in a stream of suspending and preheated diluent gases so that a relatively enormous surface is afforded for (1) heat transfer into the shale particles and (2) diffusion of the resulting hydrocarbon products out of the residual ash. Thus, there is no question (1) of trapping hydrocarbon inside solids masses where it would be cracked to coke and gas before escape is possible or (2) of slow rise in temperature inside a large mass of charge while waiting for heat to diffuse into the mass whereby no control over the temperature cycle of the innermost material is possible. On the contrary, under the conditions of this invention the fine state of subdivisions of the shale plus enveloping it in highly turbulent gas makes heat transfer and product diffusion of truly film dimensions. The time requirements are thus markedly reduced over fixed bed retorts in fact to a matter of minutes in place of hours. It is impractical to fix residence time absolutely since it depends entirely upon the type of shale processed, the desired products, the degree of fineness of grinding obtainable, etc. In general, however, reaction times in the suspension phase of under one minute are possible in the primary reactor although in instances it may be desirable to increase the total time under heat, i. e., including the time spent in the settled-out phase of the dust collectors, etc., to as much as one hour.

It is apparent that numerous modifications of my invention may be made by those skilled in this art without departing from the spirit thereof.

What I claim is:

1. The method of recovering hydrocarbon oil from solid minerals adapted to produce such oil upon application of heat, which comprises reducing said mineral to a powder, suspending the powder in a gasiform carrier medium, heating the suspension to a temperature below 1000° F. in a primary heating zone to form a quantity of hydrocarbons, separating the hydrocarbon vapors thus formed from the partially spent mineral, subjecting the minerals to further grinding, resuspending the said mineral in a second gasiform carrier medium, subjecting the suspension thus formed in a secondary heating zone where it is heated to temperatures up to about 1800° F. whereby additional quantities of hydrocarbons are formed, separating the spent minerals from the hydrocarbon vapors and fractionating the oil recovered from the first heating step, together with that formed in the second heating stage, in a fractionation zone whereby valuable hydrocarbon oils may be recovered.

2. The method set forth in claim 1 in which the suspension is subjected to temperatures within the range of from about 750-1000° F. in the primary zone and temperatures of from 1000-1800° F. in the secondary zone.

3. The method of recovering valuable hydrocarbon oils from raw shale which comprises subjecting the raw shale to a primary grinding, suspending the ground shale in a gasiform material, subjecting the suspension to temperatures within the range of from about 750-1000° F. in a primary heating zone, separating the partially spent shale from the gasiform material and the hydrocarbon vapors evolved, resuspending the partially spent shale after further grinding in a gasiform material, subjecting the suspension to heating in a secondary heating zone to temperatures of from 1000-1800° F. whereby additional quantities of hydrocarbon vapors are formed, separating the spent shale from the added gasiform material and the hydrocarbon vapors produced, and fractionating and recovering desired hydrocarbon products from both of said heating operations.

4. The method set forth in claim 3 in which a pressure below 50 lbs per square inch gauge is maintained in the heating zones whereby highly unsaturated products are produced.

5. The method set forth in claim 3 in which a pressure of from 50-200 lbs. per square inch is maintained in the heating zones in order to promote cracking of the relatively heavy hydrocarbon vapors evolved during the heating operation.

6. In the process of recovering valuable hydrocarbon oils from raw shale by subjecting the shale in powdered form while suspended in a gasiform carrier medium to a heat treatment, the improvement which comprises carrying out said heat treatment at relatively moderate distillation temperatures ranging from about 700° F. to about 1000° F., subjecting the heat-treated shale and subjecting the reground shale to further grinding suspended in a gasiform carrier medium to a second heat treatment at substantially higher temperatures ranging from about 1000° F. to about 1800° F.

7. The method set forth in claim 1 in which said gasiform carrier medium is selected from the group consisting of steam, flue gas and hydrocarbon vapors.

8. The method set forth in claim 1 in which bottoms from said fractionation zones are recycled to said secondary heating zone.

9. The method set forth in claim 1 in which a washing oil is discharged into the upper portion of said fractionation zone to remove therefrom powdered shale entrained in the vapors.

CLARKE T. HARDING.

Certificate of Correction

Patent No. 2,379,077.  June 26, 1945.

CLARKE T. HARDING

It is hereby certified that error appears in the printed specification of the above numbered patent requiring correction as follows: Page 3, second column, lines 31 and 32, claim 6, strike out the words "to further grinding" and insert the same after "shale" and before "and" in line 31, same claim; and that the said Letters Patent should be read with this correction therein that the same may conform to the record of the case in the Patent Office.

Signed and sealed this 9th day of July, A. D. 1946

[SEAL]

LESLIE FRAZER,
*First Assistant Commissioner of Patents.* mensions. The time requirements are thus markedly reduced over fixed bed retorts in fact to a matter of minutes in place of hours. It is impractical to fix residence time absolutely since it depends entirely upon the type of shale processed, the desired products, the degree of fineness of grinding obtainable, etc. In general, however, reaction times in the suspension phase of under one minute are possible in the primary reactor although in instances it may be desirable to increase the total time under heat, i. e., including the time spent in the settled-out phase of the dust collectors, etc., to as much as one hour.

It is apparent that numerous modifications of my invention may be made by those skilled in this art without departing from the spirit thereof.

What I claim is:

1. The method of recovering hydrocarbon oil from solid minerals adapted to produce such oil upon application of heat, which comprises reducing said mineral to a powder, suspending the powder in a gasiform carrier medium, heating the suspension to a temperature below 1000° F. in a primary heating zone to form a quantity of hydrocarbons, separating the hydrocarbon vapors thus formed from the partially spent mineral, subjecting the minerals to further grinding, resuspending the said mineral in a second gasiform carrier medium, subjecting the suspension thus formed in a secondary heating zone where it is heated to temperatures up to about 1800° F. whereby additional quantities of hydrocarbons are formed, separating the spent minerals from the hydrocarbon vapors and fractionating the oil recovered from the first heating step, together with that formed in the second heating stage, in a fractionation zone whereby valuable hydrocarbon oils may be recovered.

2. The method set forth in claim 1 in which the suspension is subjected to temperatures within the range of from about 750-1000° F. in the primary zone and temperatures of from 1000-1800° F. in the secondary zone.

3. The method of recovering valuable hydrocarbon oils from raw shale which comprises subjecting the raw shale to a primary grinding, suspending the ground shale in a gasiform material, subjecting the suspension to temperatures within the range of from about 750-1000° F. in a primary heating zone, separating the partially spent shale from the gasiform material and the hydrocarbon vapors evolved, resuspending the partially spent shale after further grinding in a gasiform material, subjecting the suspension to heating in a secondary heating zone to temperatures of from 1000-1800° F. whereby additional quantities of hydrocarbon vapors are formed, separating the spent shale from the added gasiform material and the hydrocarbon vapors produced, and fractionating and recovering desired hydrocarbon products from both of said heating operations.

4. The method set forth in claim 3 in which a pressure below 50 lbs per square inch gauge is maintained in the heating zones whereby highly unsaturated products are produced.

5. The method set forth in claim 3 in which a pressure of from 50-200 lbs. per square inch is maintained in the heating zones in order to promote cracking of the relatively heavy hydrocarbon vapors evolved during the heating operation.

6. In the process of recovering valuable hydrocarbon oils from raw shale by subjecting the shale in powdered form while suspended in a gasiform carrier medium to a heat treatment, the improvement which comprises carrying out said heat treatment at relatively moderate distillation temperatures ranging from about 700° F. to about 1000° F., subjecting the heat-treated shale and subjecting the reground shale to further grinding suspended in a gasiform carrier medium to a second heat treatment at substantially higher temperatures ranging from about 1000° F. to about 1800° F.

7. The method set forth in claim 1 in which said gasiform carrier medium is selected from the group consisting of steam, flue gas and hydrocarbon vapors.

8. The method set forth in claim 1 in which bottoms from said fractionation zones are recycled to said secondary heating zone.

9. The method set forth in claim 1 in which a washing oil is discharged into the upper portion of said fractionation zone to remove therefrom powdered shale entrained in the vapors.

CLARKE T. HARDING.

Certificate of Correction

Patent No. 2,379,077. June 26, 1945.

CLARKE T. HARDING

It is hereby certified that error appears in the printed specification of the above numbered patent requiring correction as follows: Page 3, second column, lines 31 and 32, claim 6, strike out the words "to further grinding" and insert the same after "shale" and before "and" in line 31, same claim; and that the said Letters Patent should be read with this correction therein that the same may conform to the record of the case in the Patent Office.

Signed and sealed this 9th day of July, A. D. 1946

[SEAL]

LESLIE FRAZER,
*First Assistant Commissioner of Patents.*